(12) United States Patent
Kirschner

(10) Patent No.: US 6,223,784 B1
(45) Date of Patent: May 1, 2001

(54) METHOD AND DEVICE FOR PRODUCING WAVE WINDINGS FOR A STATOR OF A THREE-PHASE GENERATOR

(75) Inventor: Roland Kirschner, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,122

(22) PCT Filed: Oct. 9, 1998

(86) PCT No.: PCT/DE98/02987

§ 371 Date: Aug. 6, 1999

§ 102(e) Date: Aug. 6, 1999

(87) PCT Pub. No.: WO99/34499

PCT Pub. Date: Jul. 8, 1999

(30) Foreign Application Priority Data

Dec. 23, 1997 (DE) .................................. 197 57 742
Apr. 18, 1998 (DE) .................................. 198 17 304

(51) Int. Cl.[7] ....................................................... B21F 3/00
(52) U.S. Cl. ............................................................ 140/92.2
(58) Field of Search .................... 29/732, 736; 140/92.1, 140/92.2

(56) References Cited

U.S. PATENT DOCUMENTS 5,881,778 * 3/1999 Barrera ................................ 140/92.2

* cited by examiner

Primary Examiner—Lowell A. Larson
(74) Attorney, Agent, or Firm—Michael J. Striker

(57) ABSTRACT

A method and device for producing wave windings for an electrical machine, especially for a three-phase generator, is described in which each phase has a wave winding (12) divided into two winding halves (12a,12b), which are first deformed into a wavy star shape, are offset from one another by one pole pitch, and are finally inserted jointly into the grooves of a stator lamination packet. A simple and reliable method for production of this wave winding includes first winding a first winding half (12a) in a first winding direction in a circular or polygonal shape, and then switching over the continuous winding wire (15) in a winding loop (21) into the opposite winding direction, then winding the second winding half (12b) in the opposite winding direction and deforming both winding halves simultaneously into a star shape, offsetting both winding halves (12a, 12b) with respect to each other by one pole pitch (p) so that the winding loop (21) between the winding halves transitions into the star shape.

6 Claims, 6 Drawing Sheets

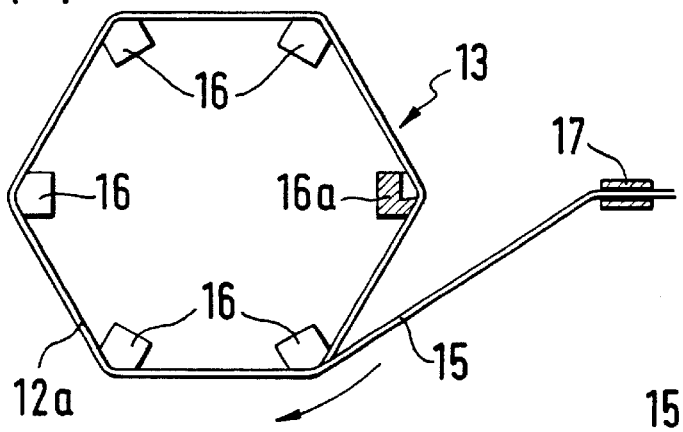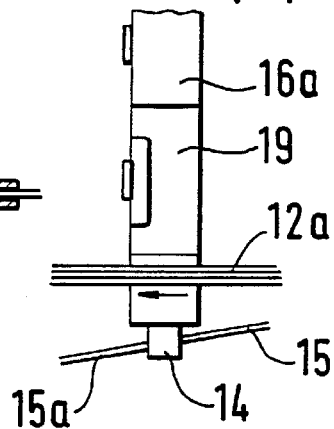
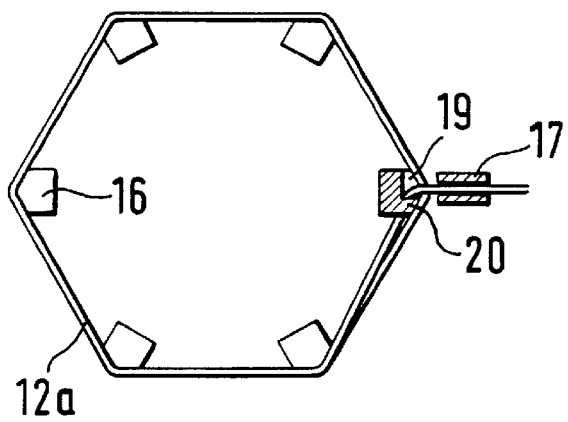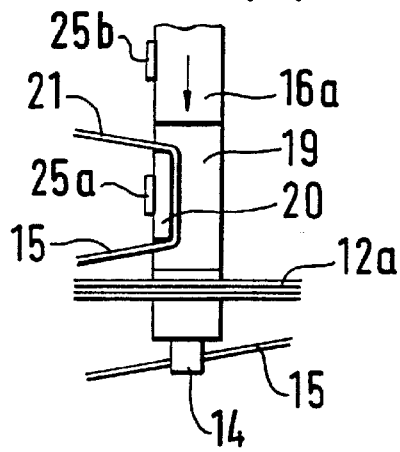
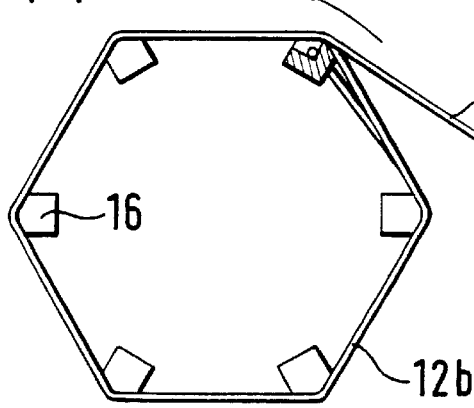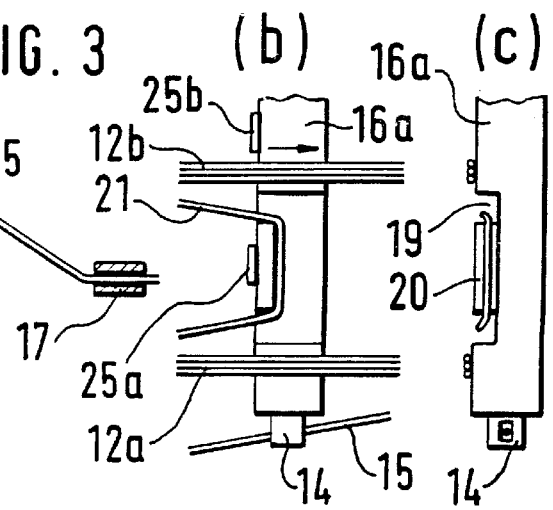

METHOD AND DEVICE FOR PRODUCING WAVE WINDINGS FOR A STATOR OF A THREE-PHASE GENERATOR

BACKGROUND OF THE INVENTION

1. Field of the Invention

The present invention relates to a method and device for producing wave windings for electrical machines, especially for a stator of a three-phase generator.

2. Prior Art

The invention is based on a method and a device for producing wave windings for electric machines according to U.S. Pat. No. 4,857,787. In that instance, the winding for each phase of a three-phase generator is first wound onto a drum or a polygon with the necessary number of windings and is then deformed into a star shape. After this, the winding is folded into two halves so that the two halves are disposed next to one another. Then the two halves are pivoted in such a way that the gaps of the star-shaped loops or waves of one winding half have a loop of the other winding half disposed in them. The wave winding of the one phase that is prepared in this manner is then inserted axially in a known manner into the slots of a stator lamination packet. In the same manner, the winding of the second and third phase of the three-phase generator are then successively preformed, divided, pivoted in relation to each other so that they are offset from one another, and inserted into the stator lamination packet.

The division of each phase winding into two parts and the pivoting in relation to one another is relatively costly in this method and can be produced by means of commercially available robots for a large-scale mass production only with a multitude of malfunction-prone manufacturing steps.

The automatic large-scale mass production of two-part wave windings with waves of that are offset from one another should be simplified and improved with the current embodiment.

SUMMARY OF THE INVENTION

It is an object of the present invention to provide an improved method for producing wave windings for electrical machines, especially for a stator of a three-phase generator, which is simpler than the current method.

It is another object of the present invention to provide an improved device for producing wave windings for electrical machines, especially for a stator of a three-phase generator.

According to the invention the method provides a wave winding for a stator of a three-phase generator, which is divided into two winding halves, each consisting of at least one continuous winding wire. Each winding half is in a circular or polygonal shape or deformed into a star shape. They are offset from each other by one pole pitch (p). The wave winding is arranged in grooves provided in a stator lamination packet so that alternating winding heads of the two winding halves are formed on both sides of the stator lamination packet around a circumference of the stator lamination packet. The method comprises the steps of:

a) winding the at least one continuous winding wire in a first winding direction to form a first winding half in the circular or polygonal shape;

b) switching over the at least one continuous winding wire into an opposite winding direction in a winding loop;

c) after the switching over of the at least one continuous winding wire, winding the at least one continuous winding wire in the opposite winding direction to form a second winding half in the circular or polygonal shape;

d) simultaneously deforming both the first winding half and the second winding half into a star shape; and e) after the deforming of step d) rotating the first winding half and the second winding half with respect to each other by one pole pitch, so that the winding loop between the first winding half and second winding half transitions into the star shape.

The device according to the invention comprises means for winding the at least one continuous winding wire in a first winding direction to form a first winding half in the circular or polygonal shape; means for switching over the at least one continuous winding wire into an opposite winding direction in a winding loop after the formation of the first winding half; means for winding the at least one continuous winding wire in the opposite winding direction to form a second winding half in the circular or polygonal shape after the switching over; means for simultaneously deforming both first winding half and the second winding half into a star shape and means for rotating the first winding half and second winding half with respect to each other by one pole pitch after the deforming so that the winding loop between the first winding half and second winding half transitions into the star shape.

The means for winding the at least one continuous winding wire to form the first winding half and the second winding half in the device according to the invention comprises a winding bell rotatable in either of two rotation directions, a plurality of radially movable forming clamps connected to the winding bell and arranged around its circumference, so that the at least one continuous winding wire is wound around the forming clamps.

The means for switching over comprises a loop puller for forming the winding loop and the means for deforming both first winding half and second winding half comprises forming levers and means for moving the forming levers radially inward to engage with the first winding half and the second winding half wound around the forming clamps.

The method according to the invention and the provided device for producing wave winding halves that are offset from one another, according to the characterizing features of the invention has the advantage that on a winding bell, the two continuous winding halves that are wound one after the other are already wound in an opposite winding direction to one another and deformed into a star shape. By way of a winding loop that is formed between the two winding halves, the two winding halves can then be rotated to the left or right in relation to each other by one pole pitch so that the waves of the two winding halves, which are embodied as star-shaped, are then offset in relation to each other by one pole pitch. Subsequently, the wave winding that is preformed in this fashion is inserted in a known manner into a stator lamination packet of a generator. In the same manner, all three-phase windings of the three-phase generators are produced separately as wave windings and are inserted one after the other into the stator lamination packet. In this manner, the wave windings, with winding halves that are offset from one another, can be produced in a simple and reliable manner in a few work steps in one winding station, and can be transferred to an insertion station.

BRIEF DESCRIPTION OF THE DRAWING

The objects, features and advantages of the invention will now be illustrated in more detail with the aid of the following description of the preferred embodiments, with reference to the accompanying figures in which:

FIGS. 1(a) and 1(b) are, respectively, schematic action plan views showing the winding of a first coil half;

FIGS. 2(a) and 2(b) are, respectively, schematic action plan views showing the winding of a loop with reversal of winding direction;

FIGS. 3(a), 3(b) and 3(c) are, respectively, schematic action plan views showing the winding of a second winding half;

DESCRIPTION OF THE PREFERRED EMBODIMENT

Figure 4:
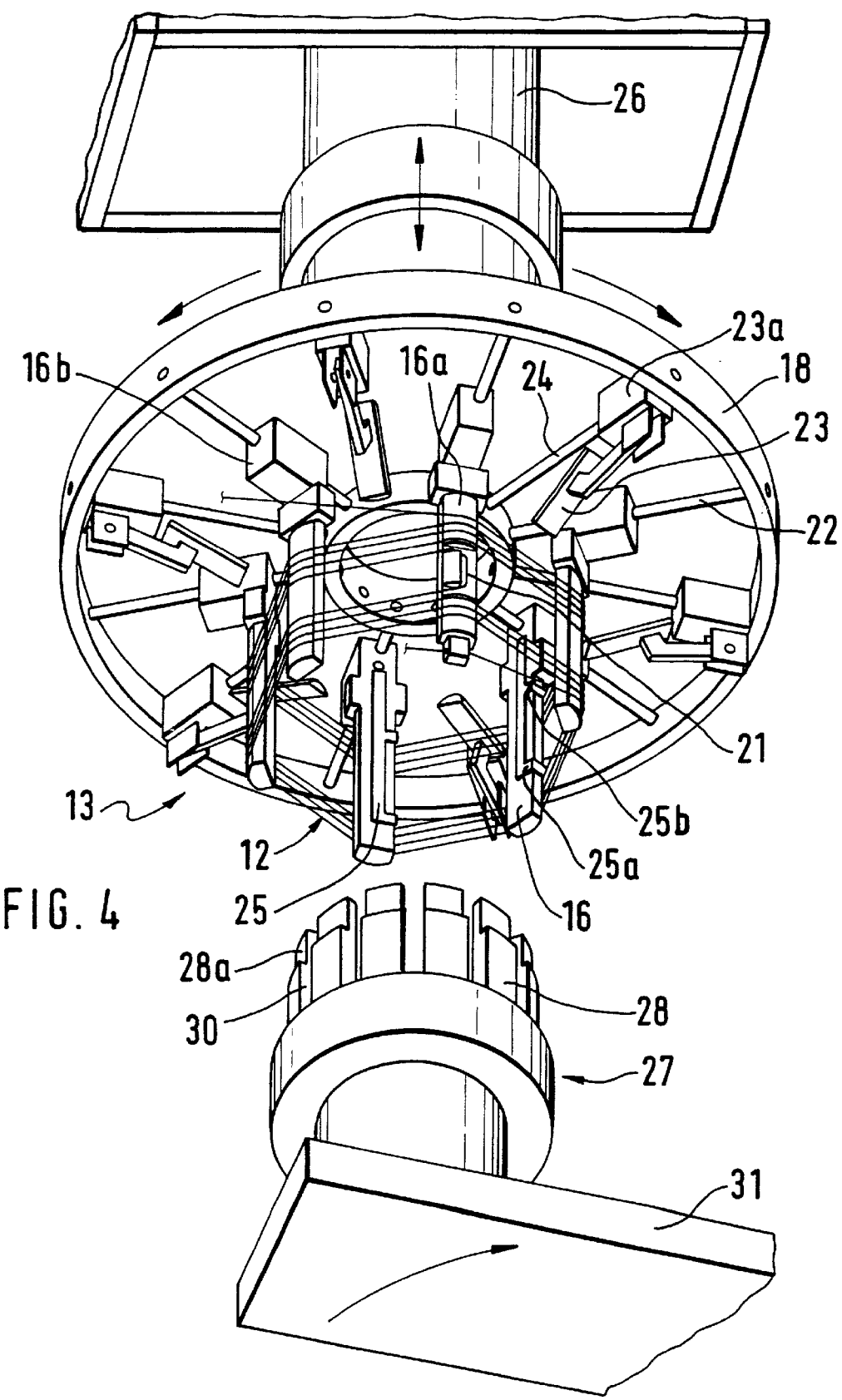
FIG. 4 is a perspective view of a winding device with an insertion tool under it.
Figure 10:
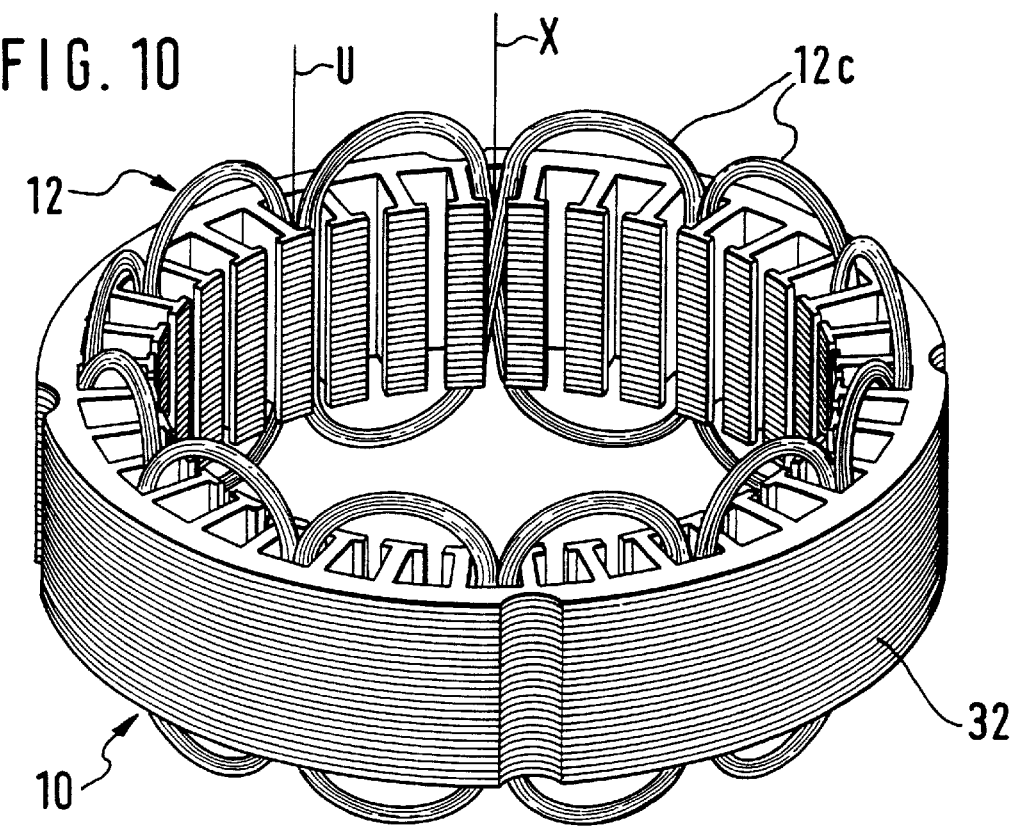
FIG. 10 is a perspective view of a stator lamination packet with one divided wave winding shown.
Figure 11:
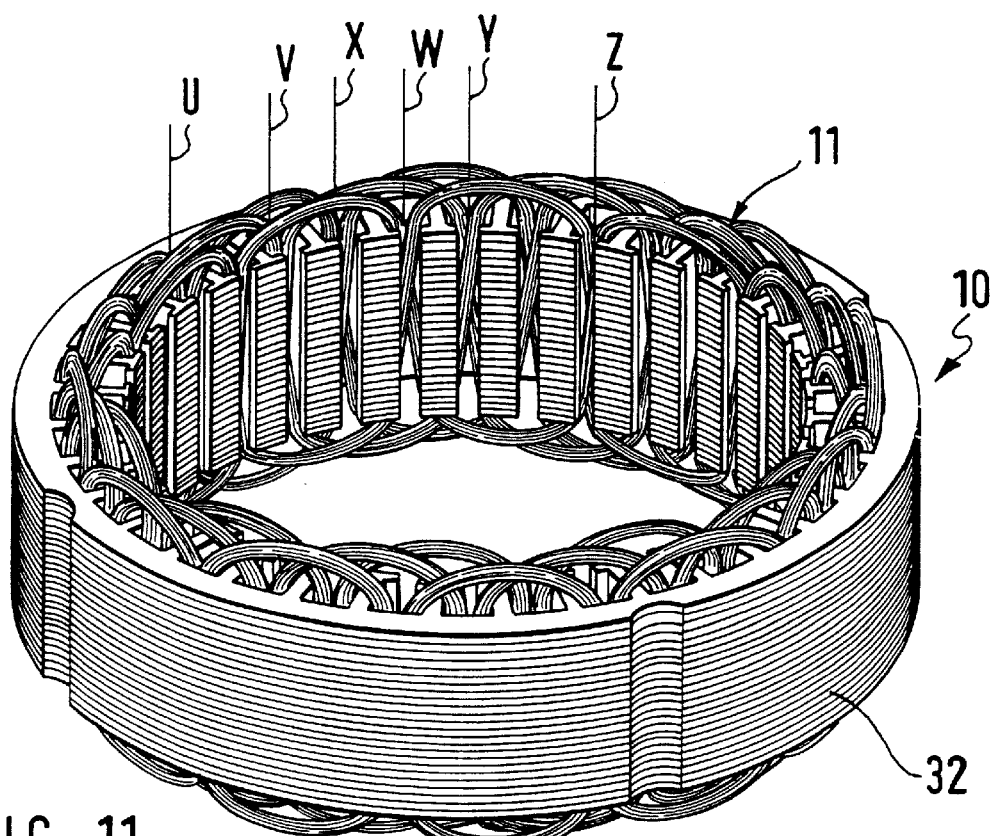
FIG. 11 is a perspective view of the finished stator with three phase windings.

In order to produce a stator 10 according to FIG. 11, with a three-phase wave winding 11, each of the three-phase strands is produced in advance on a winding device 13 according to FIG. 4 by means of a wave winding 12 with winding halves 12a and 12b that are offset from one another. FIGS. 1 to 3 schematically depict the production of such a wave winding 12 from FIG. 10. A wire clamp 14 secures one end 15a of a winding wire 15 according to FIG. 1b at the lower end of a forming clamp 16. According to FIG. 1a, six of these forming clamps are arranged in a star shape in the winding device 13. The winding wire 15 is withdrawn from a storage drum, not shown, by way of a wire orifice 17. The forming clamps 16 are disposed so that they can move radially in a winding bell 18 of the winding device 13 according to FIG. 4. In order to produce the first winding half 12a, the forming clamps 16 are rotated clockwise with the winding bell 18 so that the first winding half 12a is produced with four complete windings in a polygonal form.

Now the winding device is stopped, wherein the forming clamp 16a stays at the level of the wire orifice 17. It is clear from FIG. 2 that in its front region, the forming clamp 16a has a segment-shaped recess 19, in the front of which an axially extending, strut-shaped loop puller 20 remains. The wire orifice 17 is now conveyed to this loop puller and the winding wire 15 from the wire orifice 17 is now conveyed up from the bottom around the loop puller 20, wherein the forming clamps 16 and 16a are moved axially downward together with the winding bell 18.

Now the winding bell 18 is slowly rotated further counterclockwise and the wire orifice 17 is moved back into its outer position. This produces a winding loop 21 on the loop puller 20 as can be seen in FIG. 2b.

According to FIG. 3, the second winding half 12b is now produced in the opposite winding direction by means of a corresponding number of rotations of the winding bell 18.

FIG. 4 is a three-dimensional depiction of the winding device 13 for producing the wave winding 12. It is clear from this figure that on the underside of the winding bell 18, the six forming clamps 16 are disposed in a polygonal arrangement so that they can be moved on inwardly extending on axles 22, wherein the drive 16b is supplied pneumatically, via Bowden cables, or via other means. Forming levers 23 are respectively disposed between the forming clamps 16 and can likewise be respectively moved by way of a drive mechanism 23a on radially disposed axles 24 by pneumatic means, a Bowden cable, or the like. The six forming levers 23 are depicted in FIG. 4 in their outer position, pivoted up and in so that during the winding of the first and second winding halves 12a and 12b, they cannot protruding into the winding region. On the back side of the forming clamps 16, a stripper 25 is disposed so that it can be moved axially, which stripper protrudes above the first winding half 12a with a stripper arm 25a and protrudes above the second winding half 12b with another stripper arm 25b, as can be seen in FIGS. 1b to 3b. The winding bell 18 can be rotated by a drive mechanism 26 in the direction of the arrows in both rotation directions, and can also be moved in the axial direction.

Figure 8:
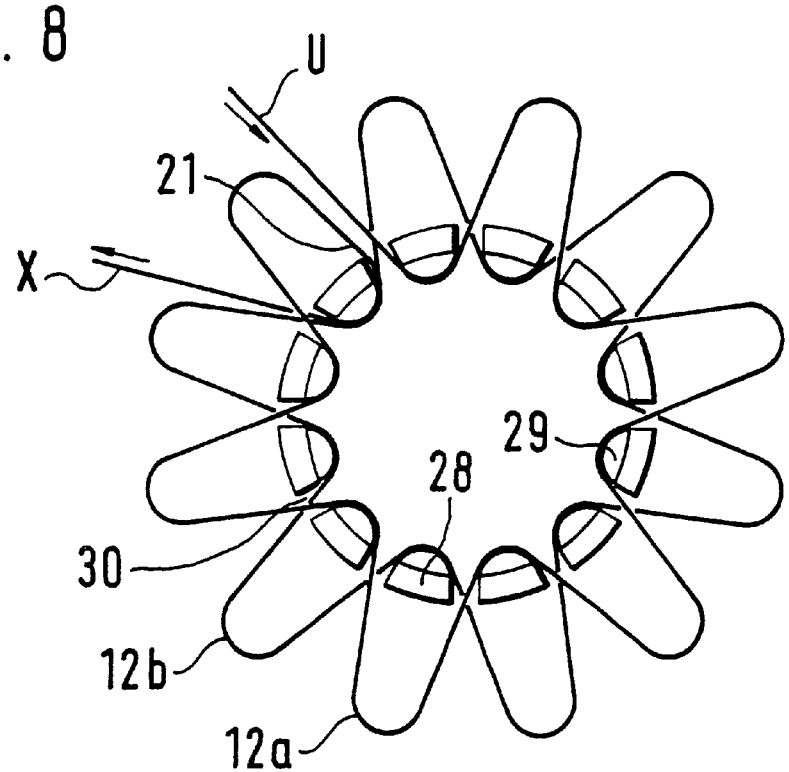
FIG. 8 is a plan view of a finished wave winding arranged in the insertion tool.

Beneath the winding bell 18 an insertion tool 27 is disposed, which has a receiving crown 28 and insertion needles 29 disposed radially inside them (visible in FIG. 8). The receiving crown 28 is provided with longitudinal slots 30 between the insertion needles 29. The insertion tool 27 rests on a tool table 31 that can be pivoted and can likewise be adjusted with regard to its height.

Figure 5:
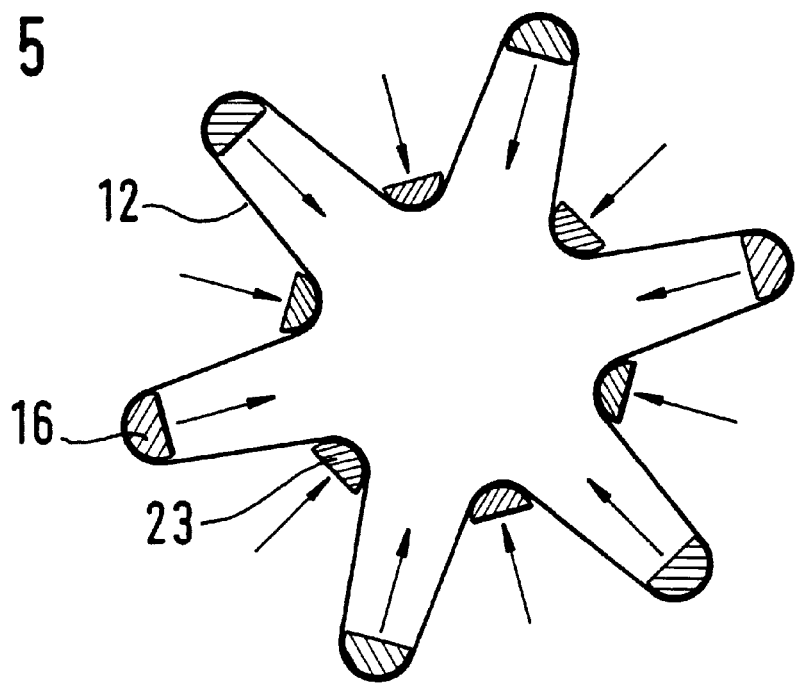
FIG. 5 is a diagrammatic plan view of a star-shaped, previously formed winding.

In another process step, the upper and lower winding halves 12a and 12b are now simultaneously deformed into a star shape according to FIG. 5, in which the six forming clamps 23 are first folded outward in a perpendicular fashion by their drive mechanism 23a and are then moved radially inward via the axles 24, as indicated by the arrows in FIG. 5. Simultaneous to this, the forming clamps 16 are slid radially inward in a yielding fashion on their axles 22, which is likewise indicated in FIG. 5 by means of corresponding arrows. Both winding halves 12a and 12b are now disposed in a star shape spaced one above the other on the forming clamps 16 and the forming levers 23.

Figure 6:
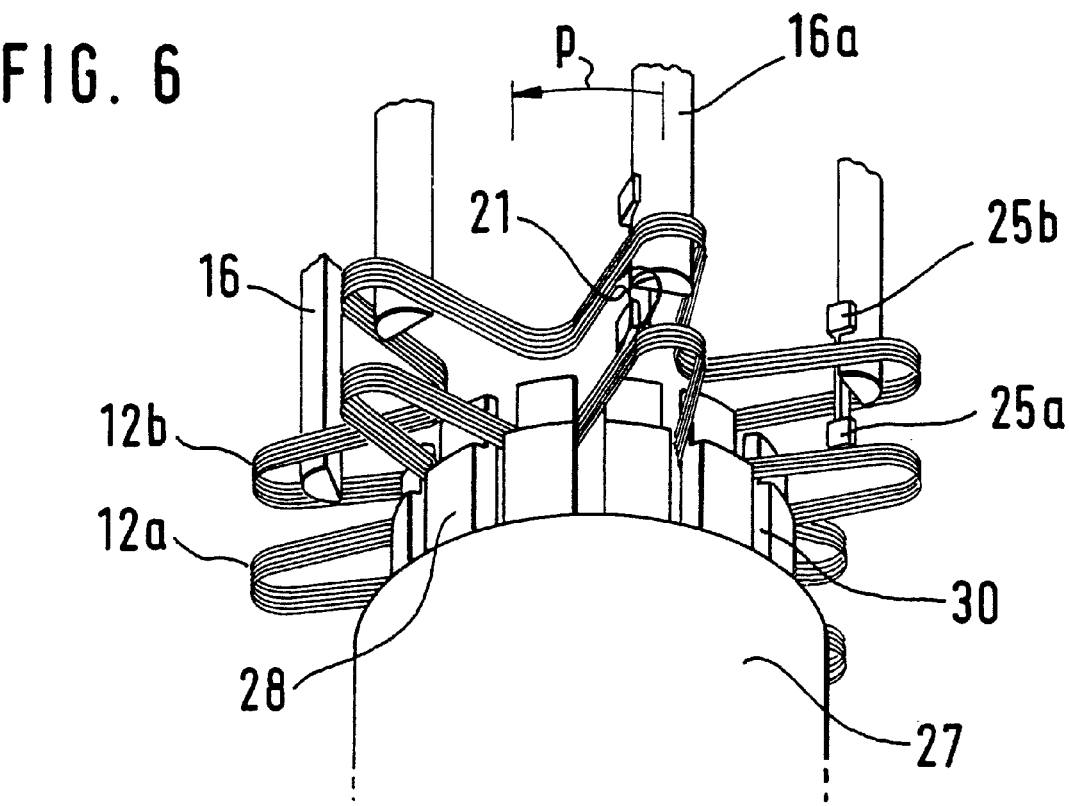
FIG. 6 is a diagrammatic cutaway perspective view of a wave winding, whose one half has been stripped into the insertion tool.

In other steps, the forming clamps 16 are then moved by 3 mm in the arrow direction according to FIG. 5, the coil 12 is released, the wire clamp 14 is opened, and then the lower winding half 12a is stripped from the forming clamps 16 by the strippers 25 according to FIG. 6, wherein these winding halves are received with their star-shaped legs into longitudinal slots 30 of the receiving crown 18 of the insertion tool 27. The upper winding half 12b is likewise slid downward by the strippers 25b, but remains in the lower region of the forming clamps. The upper and lower winding halves 12a and 12b are now connected to one another only by way of the winding loop 21.

In the subsequent process step, the winding bell 18 is then rotated back to the left by one pole pitch p of the twelve-polled wave winding 12, i.e. by 30 ° in the direction of the arrow, so that the star-shaped waves of the two winding halves 12a and 12b are now offset in relation to one another. The winding loop 21 is moved to the left so that it likewise follows the course of the upper winding half 12b.

Figure 9:
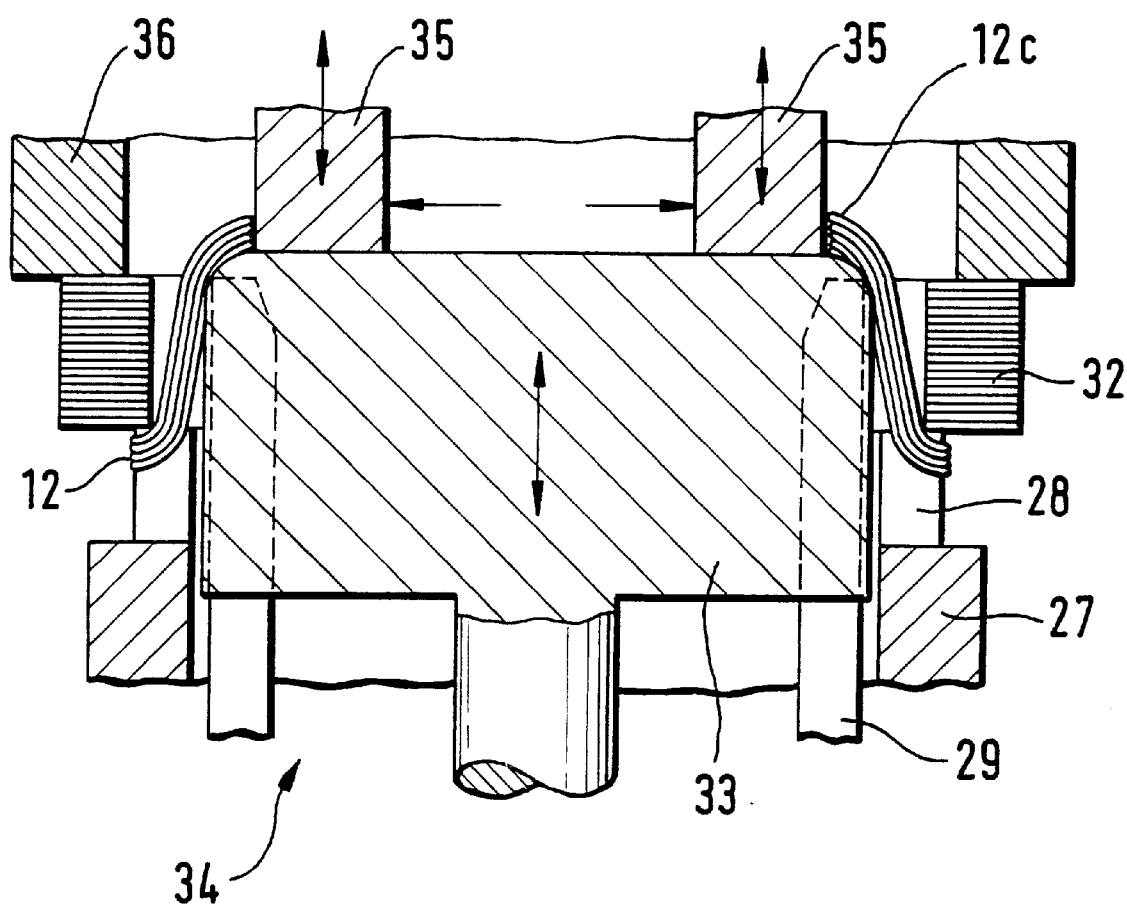
FIG. 9 is a cutaway longitudinal cross-sectional view showing the wave winding and the insertion tool after insertion of the wave winding.

In another process step, the upper winding half 12b is also stripped from the forming clamps 16 by the stripper 25 and is inserted into the longitudinal slots 30 of the receiving crown 28 of the insertion tool. As shown by FIG. 8, the waves of the two winding halves 12a and 12b are now disposed symmetrically offset from one another in the longitudinal slots 30 of the receiving crown 28. In this state, the strippers 25 are lifted up again. The forming levers are now returned back into the outer position and thereby pivoted back into their initial position according to FIG. 4, and the winding bell 18 moves upward. A stator lamination packets 32 is fixed to the upper part 28a (FIG. 4) of the receiving crown 28. Then the tool table 31 pivots in relation to an insertion station 34 that is schematically depicted in FIG. 9. The preformed wave winding 12 is inserted in a known manner into the grooves of the stator lamination packet 32 by means of an insertion die 33, and the upper winding heads 12c are pressed radially outward into the position shown in FIG. 10 by means of press-back clamps 35. A groove closure is also carried out in this station. In this manner, alternating winding heads 12c are formed from the two winding halves on both sides over the circumference of the stator lamination packet 32. In this connection, the stator lamination packet 32 is secured on the receiving crown 28 by a packet clamping ring 36.

In the manner described above, another wave winding is now produced on the winding device according to FIG. 4 and is deformed into a star shape. Then the two winding halves are rotated in relation to each other by one pole pitch in the above-described manner, are then taken by the insertion tool and finally inserted into the stator lamination packet next to the first wave winding, in the grooves provided for this purpose. The production and insertion of the third wave winding also occurs in the same manner so that in the end, a finished stator according to FIG. 11 is produced, which has a three-phase wave winding 11. The beginnings and ends of the three phases of the three-phase wave winding are labeled there with the letters U, V, W and X, Y, Z.

With these wave windings which are respectively offset from one another in opposite directions, the groove-filling factor in the stator lamination packet 32 can be increased by up to 10% in comparison to a one-piece wave windings. In generators with higher outputs, the groove-filling factor can also be increased further by virtue of the fact that instead of one winding wire with a relatively large cross-section, two or more winding wires with correspondingly smaller cross sections can be wound and connected parallel to one another.

Figure 7:
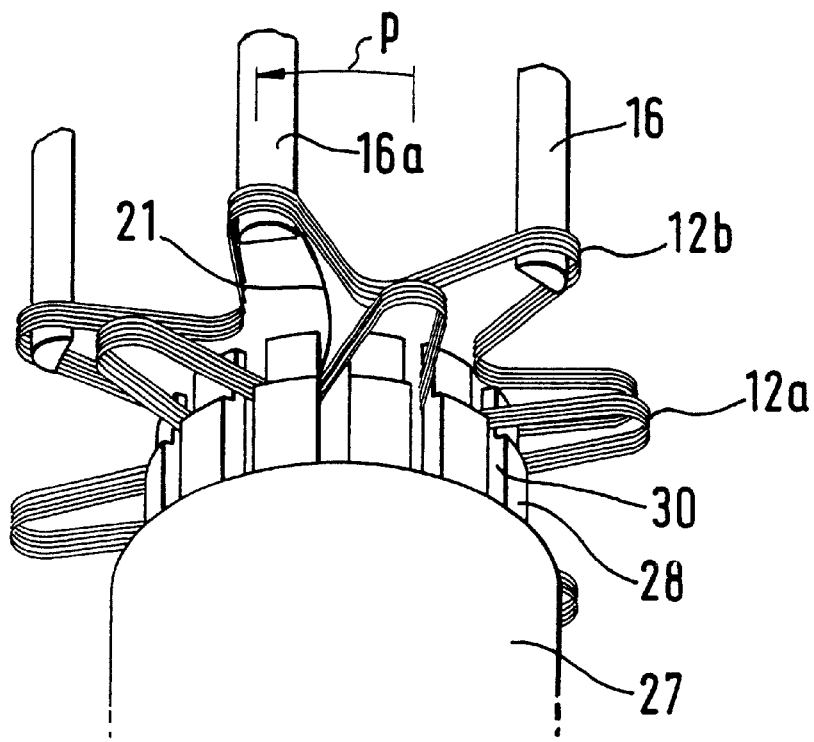
FIG. 7 is a diagrammatic cutaway perspective similar to FIG. 6, showing rotation of the upper winding half.

The pivoting of the two winding halves 12a and 12b in relation to each other in the winding device according to FIG. 4 can also occur in the same manner by means of rotating the upper winding half 12b toward the right in relation to the lower winding half 12a. In this instance, the winding loop 21 would not be folded toward the upper winding half 12b in accordance with FIG. 7, but would be folded toward the lower winding half 12a. In this instance, the winding beginning of the lower winding half 12a and the winding end of the upper winding half 12b have to be correspondingly positioned so that the lower winding half 12a does not become longer and so that the upper winding half 12b does not become shorter. In the same manner, the two winding halves 12a and 12b can alternatively also be wound in the opposite winding direction onto the forming clamps—i.e. the first half toward the right and the second half toward the left. In this instance, the loop puller must be disposed on the right side on the forming clamp 16a. With a disposition of the loop puller 21 in the center of the forming clamp 16a, the winding device can be used for both winding directions.

In any case, the current flow in the winding sections of the two winding halves inside the grooves of the lamination packet always remains the same through the rotation by 30°, i.e. by one pole pitch.

Since the wave winding is also divided into two halves in both directions at the groove outlet, the three winding strands on the coil heads only ever intersect with half the number of line wires of a neighboring phase winding. In comparison to an undivided winding, this results in a flatter winding head with a more uniform wire routing, along with a current noise reduction and improved cooling.

What is claimed is:

1. A method of making a wave winding for a stator of a three-phase generator, wherein said wave winding (12) is divided into two winding halves (12a, 12b), each of said two winding halves consists of at least one continuous winding wire (15) wound in a circular or polygonal shape or deformed into a star shape, said two winding halves are offset from each other by one pole pitch (p) and arranged in grooves provided in a stator lamination packet (32) so that alternating winding heads (12c) of the two winding halves are formed on both sides of said stator lamination packet around a circumference of said stator lamination packet, said method comprising the steps of:

a) winding said at least one continuous winding wire in a first winding direction to form a first winding half (12a) in said circular or polygonal shape;

b) switching over said at least one continuous winding wire into an opposite winding direction in a winding loop (21);

c) after the switching over of said at least one continuous winding wire, winding said at least one continuous winding wire in the opposite winding direction to form a second winding half (12b) in said circular or polygonal shape;

d) simultaneously deforming both said first winding half (12a) and said second winding half (12b) into said star shape;

e) after said deforming of step d), rotating said first winding half (12a) and said second winding half (12b) with respect to each other by said one pole pitch (p), whereby said winding loop (21) between said first winding half (12a) and said second winding half (12b) transitions into said star shape.

2. The method as defined in claim 1, further comprising providing a winding bell (18) rotatable in either of two rotation directions, a plurality of radially movable forming clamps (16) connected to the winding bell and arranged around a circumference of said winding bell (18), a loop puller (20) for deforming said at least one continuous winding wire, forming levers (23) for deforming said first winding half (12a) and said second winding half (12b) into said star shape and a receiving device for removing the first winding half (12a) and the second winding half (12b) from the forming clamps (16); and wherein the first winding half (12a) is wound onto the forming clamps (16), then said winding loop (21) for the opposite winding direction is formed by engaging said at least one continuous winding wire with said loop puller (20), subsequently said second winding half (12b) is wound onto said forming clamps (16) in the opposite winding direction so as to be axially offset with respect to said first winding half (12a), after the first winding half (12a) and the second winding half (12b) are wound on the forming clamps (16), deforming simultaneously said first winding half (12a) and said second winding half (12b) into a wavy star configuration by moving said forming levers (23) uniformly radially inward; then removing said first winding half (12a) from the forming clamps (16) by means of the receiving device; subsequently rotating the second winding half (12b) by said one pole pitch (p) and finally removing said second winding half (12b) from the forming clamps (16) of the winding bell (18) with the receiving device.

3. The method as defined in claim 2, wherein said receiving device comprises an insertion tool (27) and said loop puller (20) is arranged on a first one (16a) of said forming clamps (16).

4. A device for making a wave winding for a stator of a three-phase generator, wherein said wave winding (12) is divided into two winding halves (12a, 12b), each of said two winding halves consists of at least one continuous winding wire (15) in a circular or polygonal shape or deformed into a star shape, said two winding halves are offset from each other by one pole pitch (p) and arranged in grooves provided in a stator lamination packet (32), so that alternating winding heads (12c) of the two winding halves are formed on both sides of said stator lamination packet around a circumference of said stator lamination packet, said device comprising:

means for winding said at least one continuous winding wire in a first winding direction to form a first winding half (12a) in said circular or polygonal shape;

means for switching over said at least one continuous winding wire into an opposite winding direction in a winding loop (21) after the formation of the first winding half (12a);

means for winding said at least one continuous winding wire in the opposite winding direction to form a second winding half (12b) in said circular or polygonal shape after the switching over;

means for simultaneously deforming both said first winding half (12a) and said second winding half (12b) into said star shape; and means for rotating said first winding half (12a) and said second winding half (12b) with respect to each other by said one pole pitch (p) after the deforming, whereby said winding loop (21) between said first winding half (12a) and said second winding half (12b) transitions into said star shape;

wherein said means for winding said at least one continuous winding wire to form said first winding half (12a) and said second winding half (12b) comprises a winding bell (18), said winding bell having a circumference and being rotatable in either of two rotation directions, a plurality of radially movable forming clamps (16) connected to the winding bell and arranged around said circumference of said winding bell (18), said at least one continuous winding wire being wound around said forming clamps (16);

wherein said means for switching over comprises a loop puller (20) for forming said winding loop (21); and wherein said means for deforming both said first winding half (12a) and said second winding half (12b) comprises forming levers (23) and means (23a) for moving said forming levers radially inward to engage with said first winding half (12a) and said second winding half (12b) wound around said forming clamps (16).

5. The device as defined in claim 4, wherein said means for rotating said first winding half (12a) and said second winding half (12b) with respect to each other comprises strippers (25) arranged in the vicinity of said forming clamps (16) for said first winding half (12a) and said second winding half (12b) and means for axially moving said strippers (25) and for engaging said first winding half (12a) and said second winding half (12b) with said strippers (25) to remove one of said first winding half and said second winding half from said winding bell (18) in order to be able to rotate another of said first winding half and said second winding half with respect to said one of said first winding half and said second winding half whereby said winding loop (21) transitions into said star shape.

6. The device as defined in claim 4, wherein said loop puller (20) comprises an axial strut arranged in a segment-shaped recess (19) on a front end of one (16a) of said forming clamps (16).

* * * * *